J. G. DAVIDSON.
CHUCK.
APPLICATION FILED JUNE 4, 1913.
1,232,508.
Patented July 10, 1917.
2 SHEETS—SHEET 1.
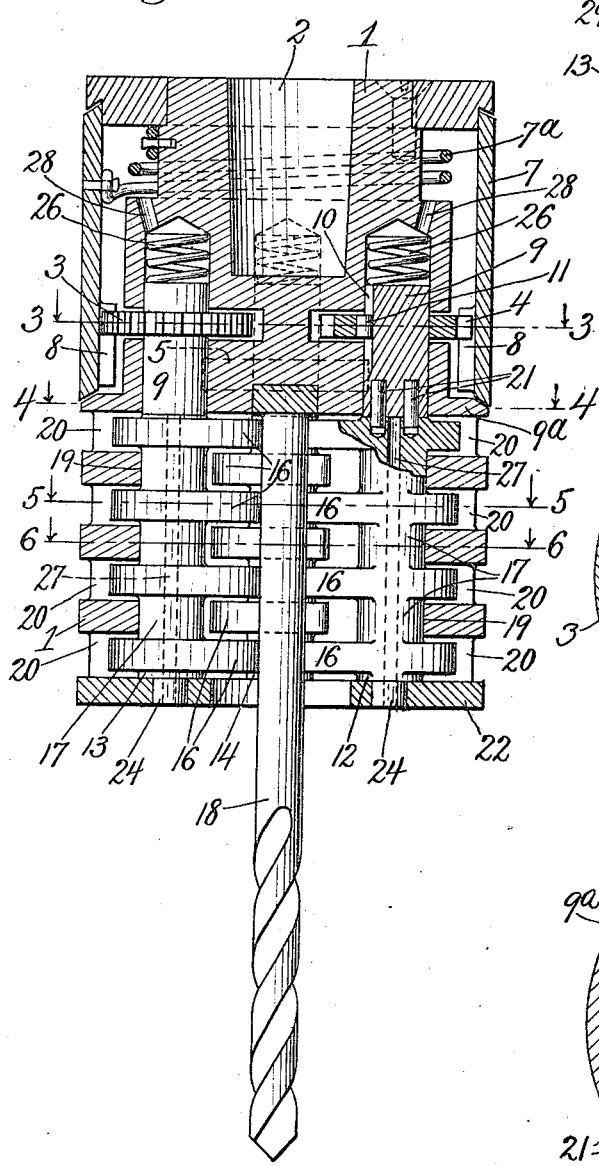
Witnesses.
Edward T. Wray.
Denie A. Walter
Inventor.
James G. Davidson.
by Parker & Carter
Attorneys.

J. G. DAVIDSON.
CHUCK.
APPLICATION FILED JUNE 4, 1913.
1,232,508.
Patented July 10, 1917.
2 SHEETS—SHEET 2.
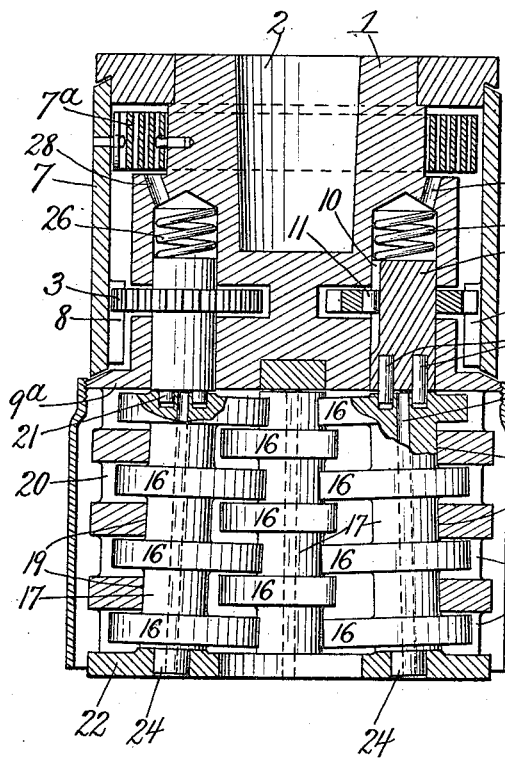
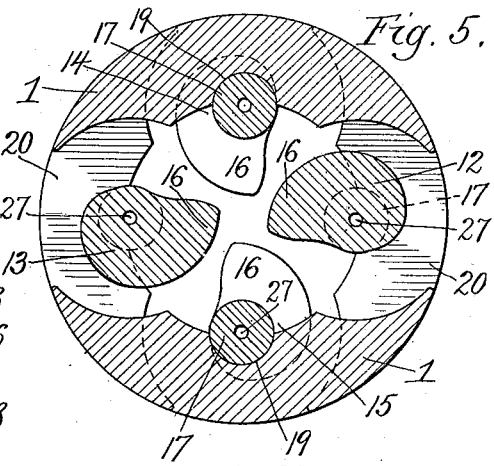
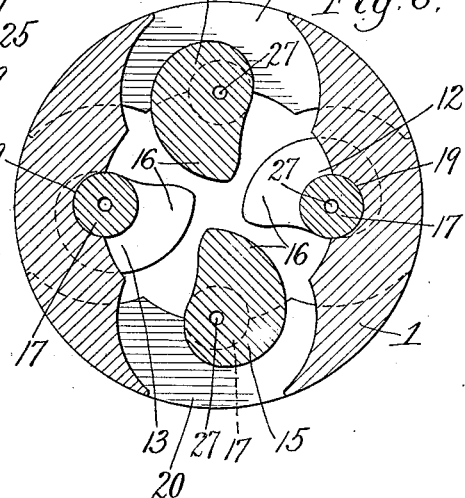
Witnesses.
Edward T. Wray.
Denie A. Walters
Inventor.
James G. Davidson.
by Parker & Carter
Attorneys.

UNITED STATES PATENT OFFICE.

JAMES G. DAVIDSON, OF CHICAGO, ILLINOIS.

CHUCK.

1,232,508.  Specification of Letters Patent.  Patented July 10, 1917.

Application filed June 4, 1913. Serial No. 771,602.

*To all whom it may concern:*

Be it known that I, JAMES G. DAVIDSON, a citizen of the United States, residing at Chicago, in the county of Cook and State of Illinois, have invented a certain new and useful Improvement in Chucks, of which the following is a specification.

This invention relates to chucks and has for its object to provide a new and improved device of this description.

The invention is illustrated in the accompanying drawing, wherein—

Figure 1 is a sectional view showing one form of chuck embodying the invention;

Fig. 2 is an end view of the chuck shown in Fig. 1;

Fig. 3 is a sectional view taken on line 3—3 of Fig. 1;

Fig. 4 is a sectional view taken on line 4—4 of Fig. 1;

Fig. 5 is a sectional view taken on line 5—5 of Fig. 1;

Fig. 6 is a sectional view taken on line 6—6 of Fig. 1;

Fig. 7 is a sectional view showing a construction for use in connection with taper shank drills.

Like numerals refer to like parts throughout the figures.

The present invention relates to chucks for use in holding drills or similar tools of various sizes so that they can be properly used. The chuck is attached to the spindle of the machine, in connection with which it is used, by the piece 1, which has an opening 2 for the spindle of such machine. The piece 1 is recessed to receive a series of gears 3, 4, 5 and 6, which control the gripping mechanism of the chuck. Extending about the piece 1 is a sleeve 7 provided with an internal gear, the teeth of which engage the teeth of gears 3, 4, 5 and 6. It will be noted from Figs. 1 and 3 that the gears 3 and 4 are opposite each other and in the same plane, while the gears 5 and 6 are opposite each other, but in a plane at one side of gears 3 and 4, and that the teeth of the internal gear 8 are long enough to engage all the gears. A shaft 9 is associated with each gear. The outer ends of said shafts pass through openings in the wall 9ª and work in said openings as bearings, the shafts completely filling the openings so that no dirt can pass through the openings to the gears. The shafts 9 are provided with keyways 10 and the gears are provided with keys 11.

In assembling the parts, the gears are placed in their receiving spaces, the sleeve 7 being removed at that time, the keys being connected with the gears. The shafts 9 are then inserted through the openings in the wall 9ª and pass through the gears so as to take the position shown in Fig. 1, the keys 11 entering the keyways 10 so as to connect the gears with the shafts. It will thus be seen that when the sleeve 7 is in place the gears will be completely inclosed so that they are protected from chips, oil and dirt. Beyond the wall 9ª the interior of the piece 1 is cut away to receive the gripping jaws of the chuck. Inclosed in the piece 1 are a series of gripping devices 12, 13, 14 and 15, each consisting of a series of gripping jaws 16 separated by intermediate bearing parts 17, preferably integral with the jaws, the jaws being eccentrically connected with the intermediate bearing parts.

In the present instance I have shown four gripping devices arranged in pairs, the gripping jaws of one pair being opposite each other as shown, the gripping jaws of the other pair being opposite each other, but in different planes and intermediate the gripping jaws of the first mentioned pair. The drill or other tool 18 is inserted between these gripping jaws so as to be clamped thereby, as shown in Figs. 1 and 2. The intermediate bearing parts 17 engage the bearing faces 19 of the piece 1. The piece 1 is cut away between the bearing faces 19 so as to form the openings 20. These openings act to permit the jaws to be given a complete rotation, thus permitting said jaws to be used through any angle. When these openings extend through the outside of the barrel, they provide means for the discharge of the chips, etc. The gripping devices 12, 13, 14 and 15 are connected with the shafts 9 by any suitable interlocking connection pins 21 which fit into openings in the ends of the shafts and the ends of the gripping devices as shown in Figs. 1 and 4. In this construction there is no side friction. The gripping devices are held in place by the plate 22 which is fastened to the piece 1 in any desired manner by the screws 23 (see Fig. 2). The gripping devices are provided with end bearing pieces 24 which are received in openings in the plate. By means of the arrangement shown the longest radius vector of the gripping jaws of one pair of gripping devices can come together without interfering with the coming together of the longest radius vector of the gripping jaws of the other pair of gripping devices. In other words, by means of this construction all points simultaneously engage the tool used in the chuck and any desired number of gripping devices may be used. When it is desired to cause the gripping jaws to engage the tool, the sleeve 7 is rotated. This rotates the gears 3, 4, 5 and 6 which, through the shafts 9 and pins 21, causes a rotation of the gripping devices so as to enlarge the space between the gripping jaws. The drill is then placed in this space and the sleeve rotated in the opposite direction to cause the gripping jaws to engage the tool. I prefer to provide a spring 7ª, having one end connected with the piece 1 and the other end connected with the sleeve 7, said spring normally continuing to rotate the sleeve 7 so as to move the gripping jaws toward the tool and when this spring is used it is only necessary to release the sleeve 7 when the tool is placed in position, the spring causing the jaws to engage. When the jaws are in engagement any tendency of the tool to rotate causes the jaws to grip it more tightly.

In Fig. 1, I have shown a construction adapted to receive tools with straight ends. To adapt this device to receive tools with tapered ends, it is necessary to either provide the gripping jaws with tapered faces, or, if the jaws are provided with straight faces, to arrange tapering bearings for the gripping devices.

In Fig. 7, I have shown a construction adapted for tools with tapered ends. In this construction the openings in the plate 22 have the bearing pieces 24 which are spread apart, as it were, so as to be out of alinement with the shafts 9, thus causing the opposing gripping jaws to be more widely separated at the outer ends of the gripping devices than at the inner ends thereof so that they will all properly engage a tool with a tapered end.

In Fig. 7, I have also shown a protecting shell 25 which surrounds and protects the end of the piece 1 containing the gripping devices and prevents the chips and oil from flying out by centrifugal force, and at the same time permits them to be discharged.

Springs 26 are located in the openings into which the shafts 9 are received and tend normally to hold said shafts against the ends of the gripping devices and keep the connecting pins 21 in proper connection therewith.

In Fig. 1, I have shown the spring 7ª as made of wire while in Fig. 7 I have shown said spring as a flat coiled spring. It will be noted in this construction that the bearings for the gripping surfaces of the gripping devices are in different planes along the axes thereof from the gripping surfaces of the gripping devices. It will be further noted that they are also in different planes parallel to the axes.

As shown in the drawings the gripping devices 12, 13, 14, 15 are each provided with a central opening 27 which extends therethrough so that a wire or rod may be inserted. This wire or rod when pushed into one of these openings engages the lower end of the shaft 9, and when pressure is applied moves said shaft against the spring 26 so as to disengage the pins 21 from the gripping devices.

Holes 28 are provided, by means of which the bearings of the parts 9 may be oiled if desired. Suitable stops 29 may be provided for the parts 16 so as to limit their movement and prevent them from moving so as to permit the spring 7ª to become uncoiled. In inserting and withdrawing the drill, the parts are moved by hand by grasping the barrel or sleeve 7 and the piece 1 and moving them relatively so as to open or close the jaws. When the chuck is attached to the spindle, this may be done by simply grasping the sleeve 7.

I claim:—

1. A chuck provided with a plurality of gripping devices and a controlling mechanism therefor, the gripping devices and controlling mechanism separate from each other and adapted to be operatively connected together, said gripping devices and controlling mechanism being separately inclosed so that dust or dirt from the gripping devices cannot enter the inclosure containing the controlling mechanism.

2. A chuck comprising a unitary piece of material provided with an opening for a spindle, by means of which the chuck is rotated, gripping devices and operating mechanisms therefor associated with said piece of material, said piece of material cut away at one end to receive the gripping devices, portions of said piece of material forming bearings for said gripping devices, said bearings fixed with relation to the opening for said spindle, said piece of material cut away at a different point along its length to receive the operating mechanism, there being a separating wall between the gripping devices and the operating mechanism.

3. A chuck provided with a plurality of gripping devices, a plurality of bearing surfaces for each of said gripping devices, a plurality of gripping surfaces on each of said gripping devices projecting eccentrically from the gripping device, there being bearing surfaces intermediate said gripping surfaces, some of said gripping surfaces projecting between other of said gripping surfaces, each gripping surface of each gripping device being opposite a bearing surface of another gripping device.

4. A drill chuck provided with a plurality of gripping devices, controlling mechanism for said gripping devices, a unitary piece of material cut away at one end to receive the gripping devices and at the other end to receive the controlling mechanism, thereby forming separated chambers for the controlling mechanism and gripping devices, so that the chips formed in operating the drill cannot come into contact with the operating mechanism, bearings integral with said unitary piece of material for receiving the side thrust on said gripping devices, said piece of material provided with an opening for a spindle, by means of which the chuck is rotated, said opening and said bearings being fixed with relation to each other so that the axes of the gripping devices are always held in the same position with relation to said opening, whereby wabbling of the drill is prevented.

5. A drill chuck comprising a plurality of gripping devices, controlling mechanism therefor, a unitary piece of material having separate receiving spaces for the controlling mechanism and gripping devices so that chips formed in the use of the drill cannot come into contact with said controlling mechanism, said unitary piece of material provided with bearings for receiving the lateral thrust on said gripping devices, and also with an opening for receiving the spindle, by means of which the chuck is rotated.

6. A chuck comprising a plurality of gripping devices, separate actuating shafts therefor, the gripping devices and actuating shafts being separately inclosed, and means for operatively connecting the gripping devices and actuating shafts.

7. A chuck comprising a unitary piece of material, gripping devices and operating mechanism therefor, associated therewith, said piece of material cut away at one end to receive the gripping devices and at a different point along its length to receive the operating mechanism, said piece of material, having openings in its sides so as to permit chips and dirt to escape and an inclosing shell therefor open at the bottom to permit the escape of said chips and dirt.

8. A chuck comprising a series of gripping devices, a plurality of gripping surfaces on each of said gripping devices projecting eccentrically from the gripping device, an integral support for said gripping devices cut away at different points along its length having a series of separated gripping surfaces, the intermediate portions of the gripping devices reduced in size and the gripping surfaces adapted to project into the cut-away portions of the support, the portions of the support remaining intact engaging the gripping devices at the reduced portions thereof some of the cut away portions of the support being in different planes along the axes of said gripping devices from other of said cutaway portions whereby gripping surfaces of the gripping devices are free to swing to the center of the chuck.

9. A chuck comprising a plurality of gripping devices, shafts removably connected with said gripping devices, springs normally holding said shafts in their connecting positions, said gripping devices provided with opening through which may be inserted a disengaging device for disengaging the shafts therefrom.

In testimony whereof, I affix my signature, in the presence of two witnesses, this 15th day of May, 1913.

JAMES G. DAVIDSON.

Witnesses:
 DENIE A. WALTERS,
 MINNIE M. LINDENAU.

Copies of this patent may be obtained for five cents each, by addressing the "Commissioner of Patents, Washington, D. C."